(12) United States Patent
Green

(10) Patent No.: US 10,180,152 B2
(45) Date of Patent: Jan. 15, 2019

(54) PET FOOD RECEPTACLE ANCHOR SYSTEM AND METHOD

(71) Applicant: Jabari Green, Columbia, SC (US)

(72) Inventor: Jabari Green, Columbia, SC (US)

( * ) Notice: Subject to any disclaimer, the term of this patent is extended or adjusted under 35 U.S.C. 154(b) by 0 days.

(21) Appl. No.: 15/408,547

(22) Filed: Jan. 18, 2017

(65) Prior Publication Data

US 2018/0201411 A1     Jul. 19, 2018

(51) Int. Cl.
| | |
|---|---|
| *A45F 3/44* | (2006.01) |
| *F16B 5/02* | (2006.01) |
| *A01K 7/00* | (2006.01) |
| *A01K 5/01* | (2006.01) |
| *F16B 5/06* | (2006.01) |
| *F16B 21/16* | (2006.01) |

(52) U.S. Cl.
CPC .............. *F16B 5/02* (2013.01); *A01K 5/0135* (2013.01); *A01K 7/005* (2013.01); *F16B 5/0664* (2013.01); *F16B 21/165* (2013.01)

(58) Field of Classification Search
CPC ..... Y10T 403/32475; Y10T 403/32483; Y10T 403/4608
USPC ... 248/684, 156, 216.1, 216.4, 217.2, 217.3, 248/217.4, 218.1, 218.2, 346.01, 346.03, 248/314, 500, 506, 508; 119/61.54, 119/61.57, 61.5; 403/109.2, 109.3, 233; 220/475
See application file for complete search history.

(56) References Cited

U.S. PATENT DOCUMENTS

| | | | | |
|---|---|---|---|---|
| 1,879,220 | A * | 9/1932 | Harmony | A01G 9/02 248/146 |
| 4,454,824 | A * | 6/1984 | Wood | A45F 3/44 109/50 |
| 4,850,564 | A * | 7/1989 | Padin | E04H 12/2223 248/156 |
| 5,098,057 | A * | 3/1992 | Gran | E02D 5/801 248/156 |
| 5,135,192 | A * | 8/1992 | Winkler | E04H 12/2223 248/156 |
| 5,139,219 | A * | 8/1992 | Navarro | B65B 67/12 248/156 |
| 5,148,626 | A * | 9/1992 | Haake, Sr. | A01K 5/0142 119/61.53 |
| 5,224,443 | A * | 7/1993 | Leslie | A01K 5/0114 119/447 |

(Continued)

*Primary Examiner* — Terrell L McKinnon
*Assistant Examiner* — Michael McDuffie
(74) *Attorney, Agent, or Firm* — Southeast IP Group, LLC.; Thomas L. Moses

(57) ABSTRACT

A pet food and water receptacle anchoring system includes an anchor that is removably coupled to an anchor receiver on an underside of the food/water receptacle. In a preferred embodiment, the anchor comprises a head member on an upper portion and a screw member on a lower portion, wherein the head member is preferably of a square cross-section, and includes a spring-loaded ballbearing that extends slightly outwardly from at least one side of the head member. The anchor may be screwed downwardly into any surface, or alternatively into a sleeve that is secured into a cement surface. Preferably, at least one inner side of the anchor receiver (and more preferably, all inner sides thereof) include a slight indentation that engages the spring-loaded ballbearing that is disposed on one side of the anchor head for snap fit engagement.

12 Claims, 7 Drawing Sheets

(56) References Cited

U.S. PATENT DOCUMENTS

| | | | |
|---|---|---|---|
| 5,526,773 A | | 6/1996 | Richardson |
| 5,586,647 A | * | 12/1996 | Barta ................ A47G 19/2255 |
| | | | 206/217 |
| 5,628,276 A | * | 5/1997 | Raposa ................ A01K 5/0114 |
| | | | 119/61.54 |
| 6,149,119 A | * | 11/2000 | O'Connell ............ A47G 7/025 |
| | | | 248/146 |
| 6,425,555 B1 | * | 7/2002 | Hedeman ............... A47G 7/041 |
| | | | 248/156 |
| 6,581,541 B2 | * | 6/2003 | Hollinger ............ A01K 5/0114 |
| | | | 119/61.5 |
| 6,676,092 B2 | * | 1/2004 | Tsai ...................... B65F 1/1415 |
| | | | 248/149 |
| 6,820,379 B1 | * | 11/2004 | Krinner ............... E04H 12/2223 |
| | | | 108/156 |
| 7,007,910 B1 | * | 3/2006 | Krinner ............... E04H 12/2215 |
| | | | 248/156 |
| 8,146,533 B2 | * | 4/2012 | Beltezore ............... A23K 50/40 |
| | | | 119/51.03 |
| 8,407,949 B2 | * | 4/2013 | Kellner .................. E02D 5/801 |
| | | | 248/156 |
| 8,800,493 B2 | * | 8/2014 | Harding ............... A01K 5/0142 |
| | | | 119/61.57 |
| 2002/0121580 A1 | * | 9/2002 | Grady ................ A47G 29/1216 |
| | | | 248/146 |
| 2006/0249089 A1 | | 11/2006 | Behunin |
| 2008/0064580 A1 | * | 3/2008 | Hollowell .......... A63B 21/1636 |
| | | | 482/148 |
| 2011/0041772 A1 | | 2/2011 | Hargrove |
| 2013/0255583 A1 | | 10/2013 | Miller, Sr. et al. |

\* cited by examiner

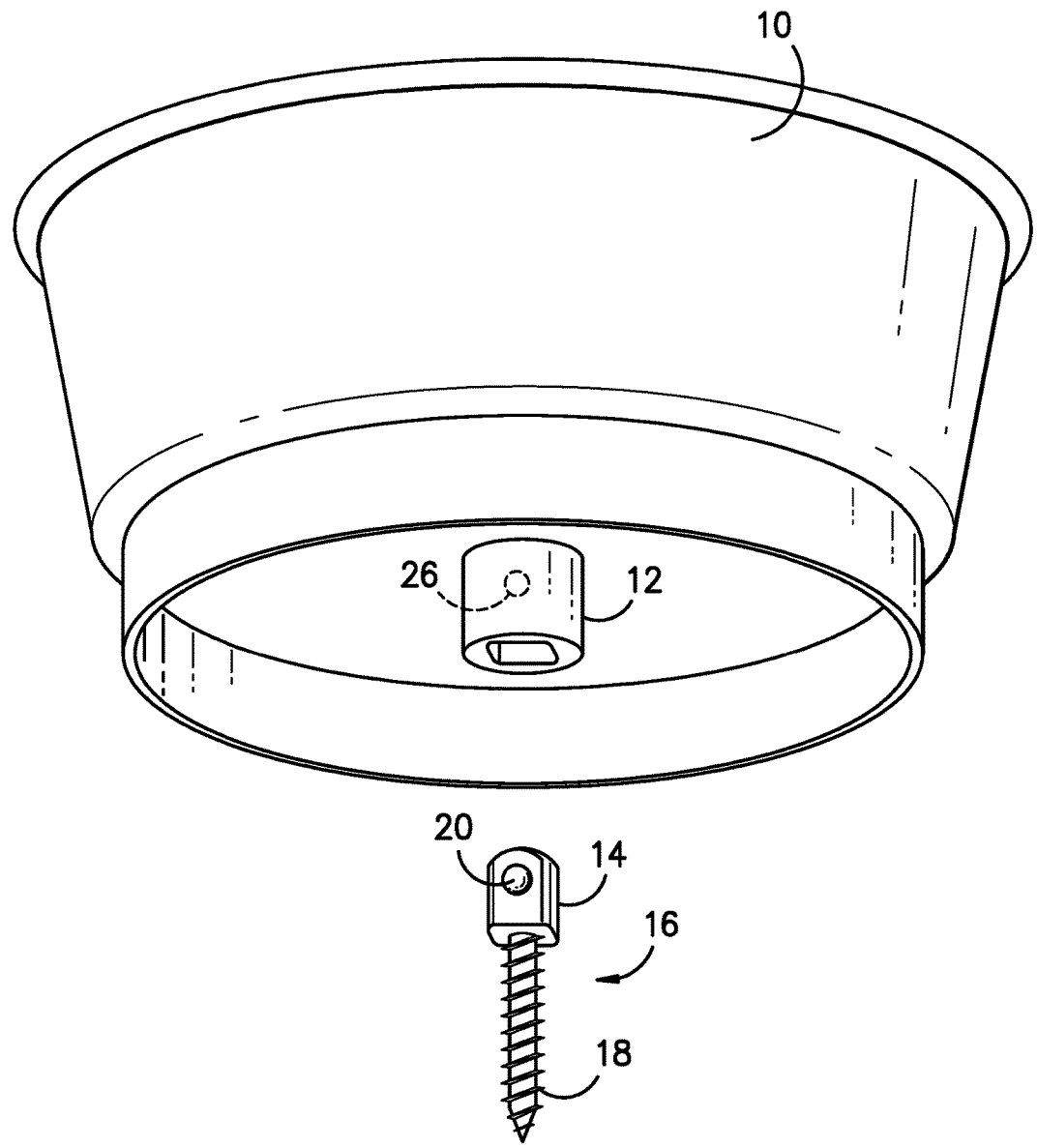
FIG. -1-

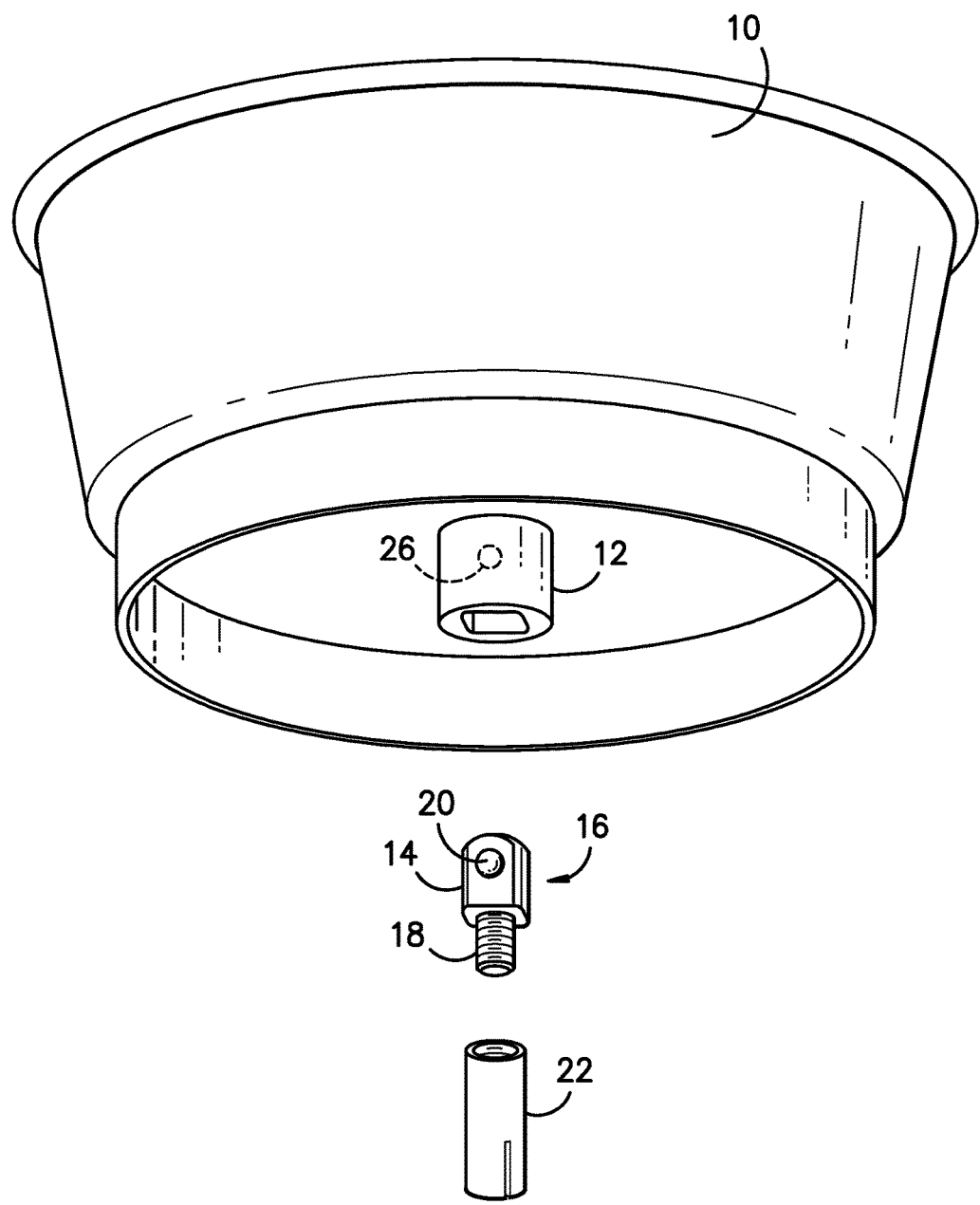
FIG. -2-

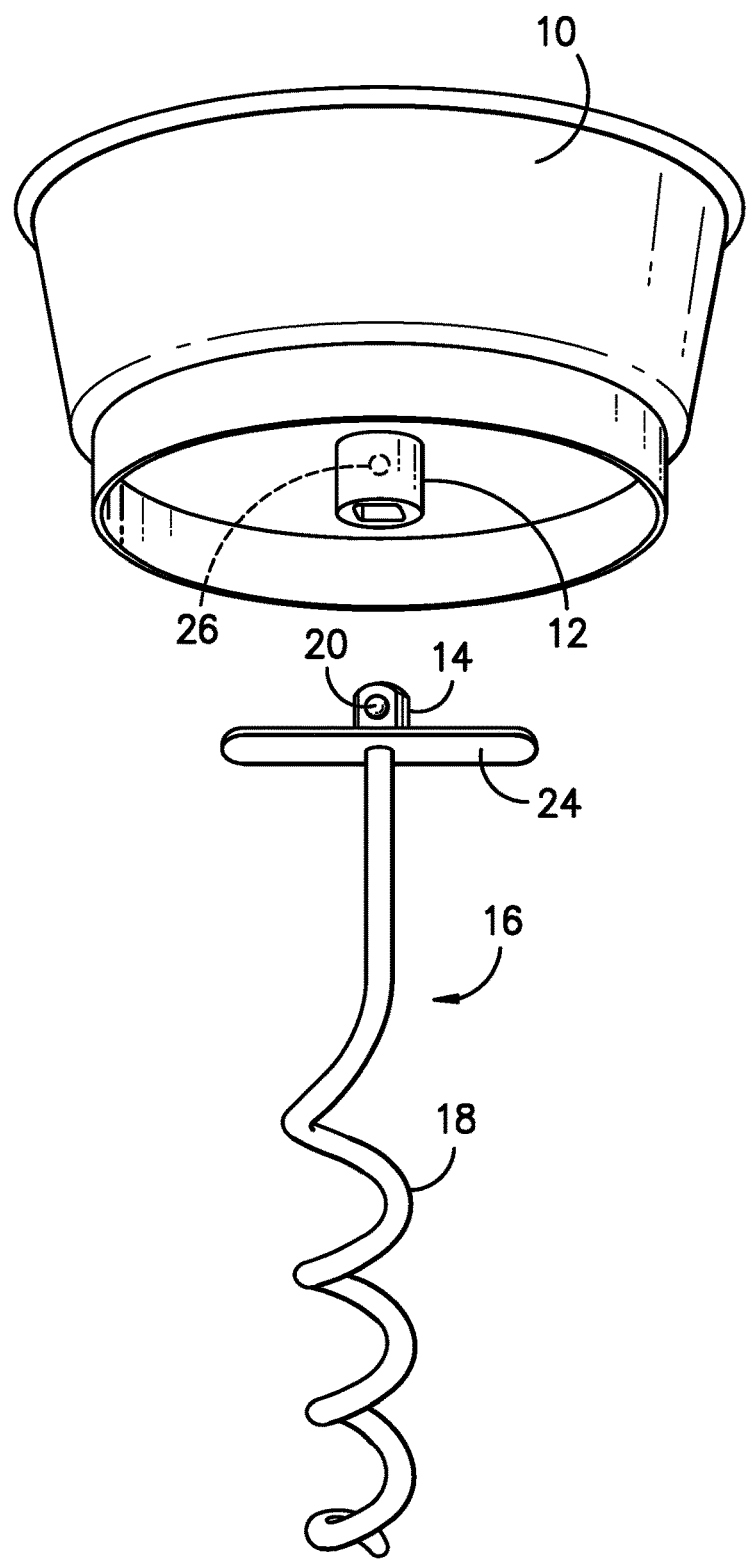
FIG. -3-

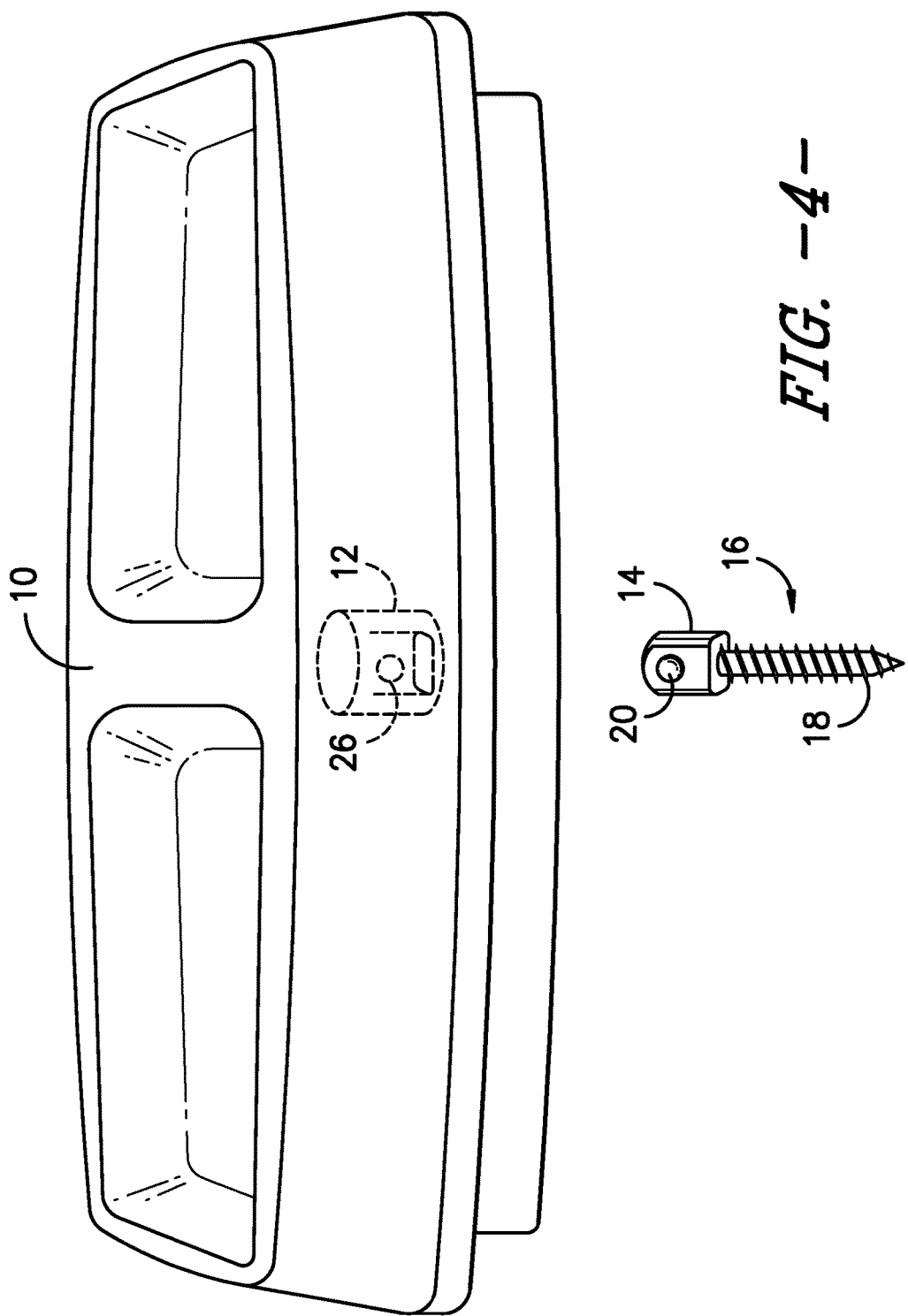

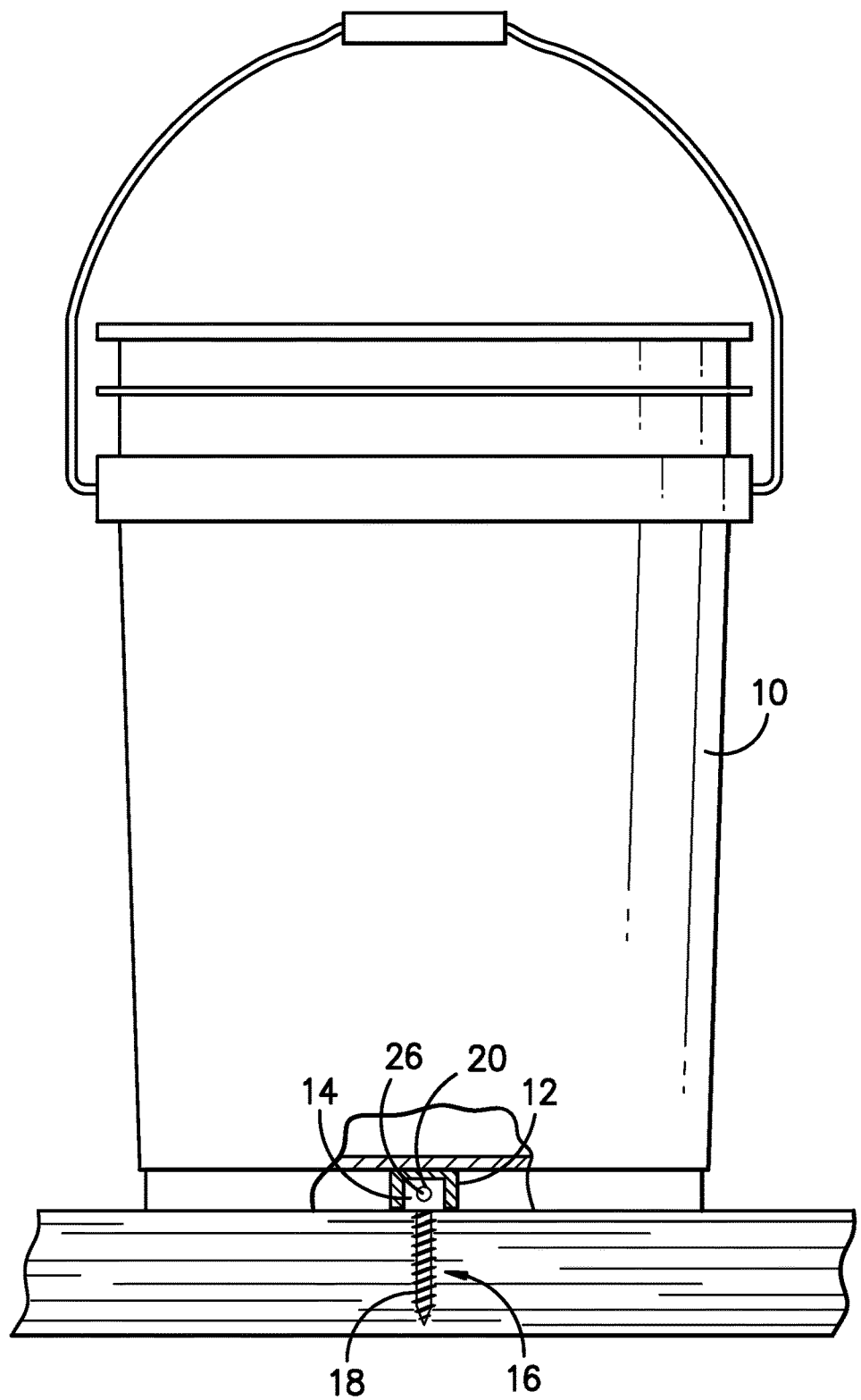
FIG. -5-

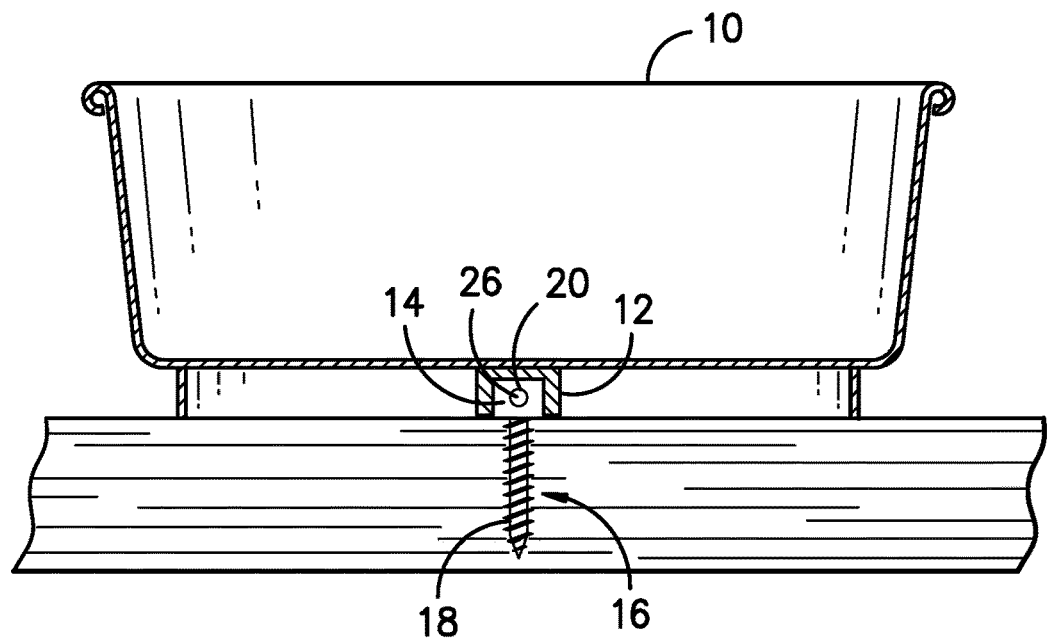
FIG. -6-
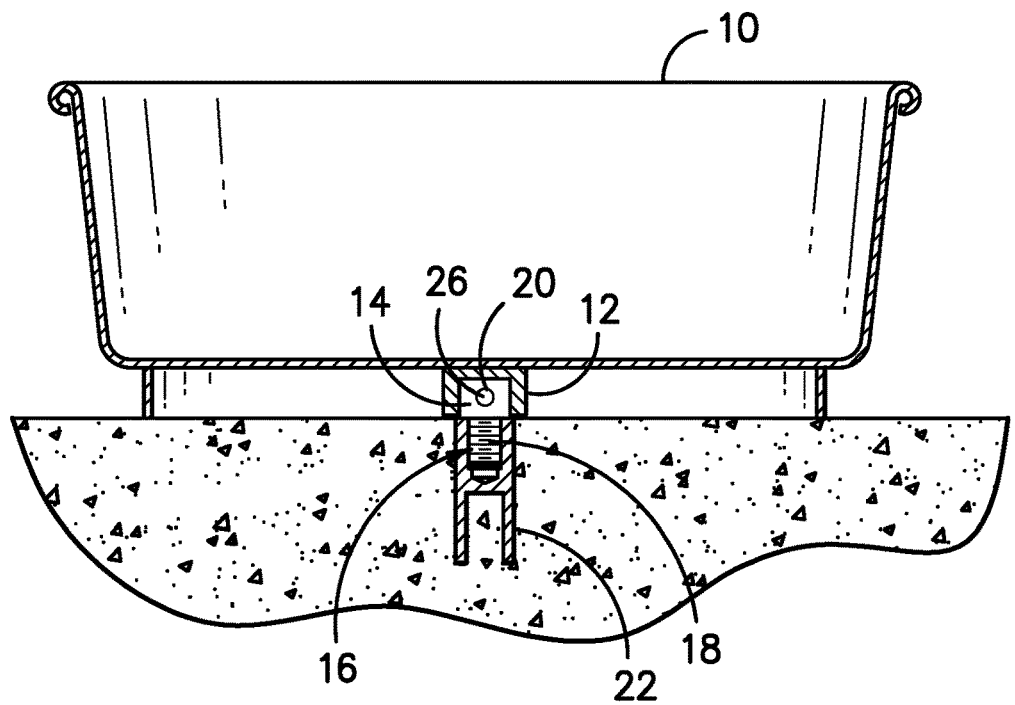
FIG. -7-

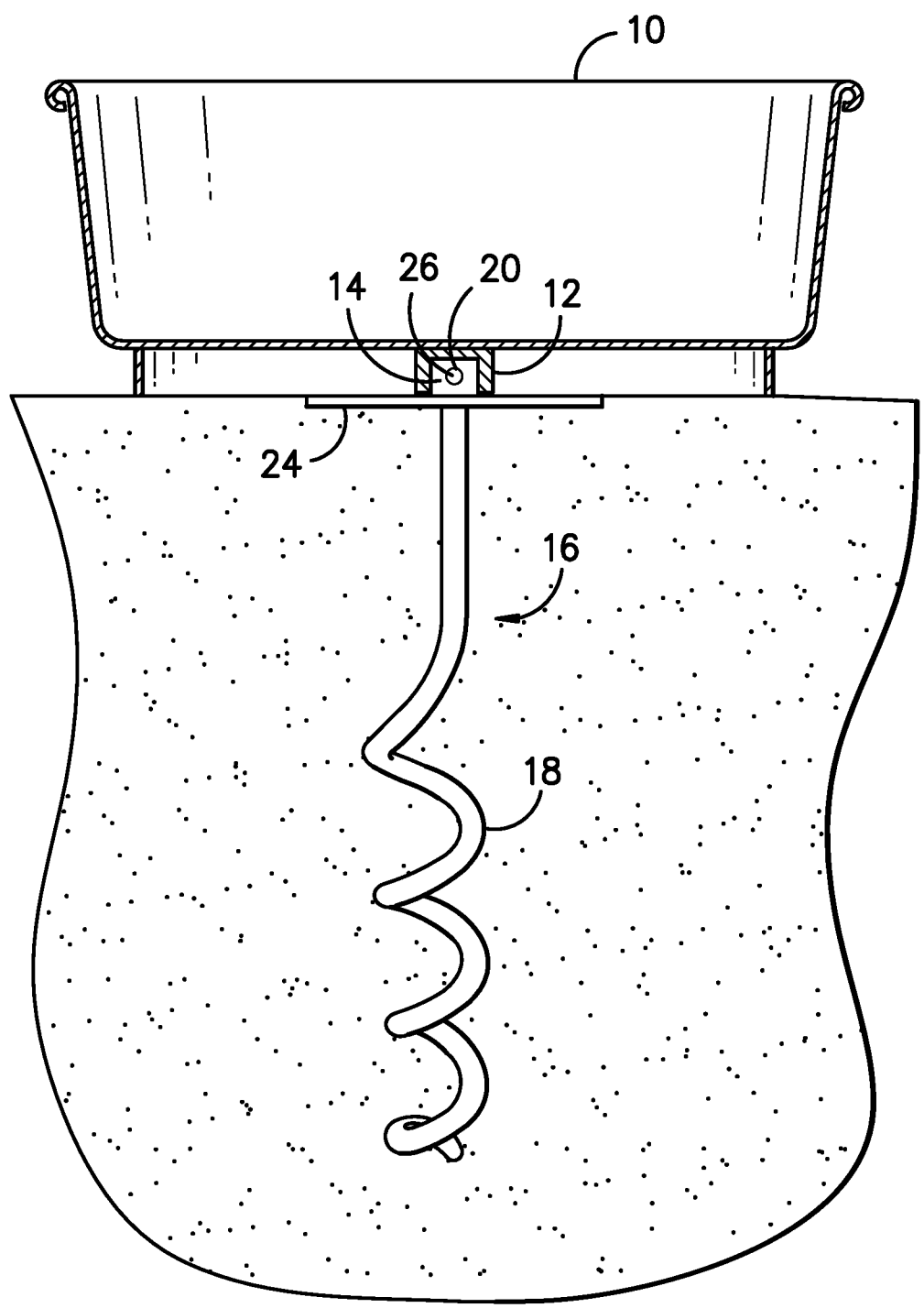
FIG. -8-

PET FOOD RECEPTACLE ANCHOR SYSTEM AND METHOD

BACKGROUND OF THE INVENTION

Field of the Invention

The present invention relates to a system and method for anchoring a pet food bowl or receptacle on various types of surfaces, in order to prevent the food receptacle from becoming overturned or inadvertently moved while the pet is feeding from the receptacle. More specifically, the present invention includes, in one embodiment, an anchor that may be secured into a wood surface, concrete surface, dirt surface, or other type of terrain or surface, wherein the anchor includes an anchor head that serves as a male member that may be received by a complementary female member that is attached to an underside of a pet food or water receptacle.

Description of the Prior Art

Other types of devices have been devised to prevent spillage or overturning of pet food and water receptacles. The references listed below are hereby incorporated herein by reference, in their entireties:

U.S. Pat. No. 5,526,773

A three-piece pet food water dish assembly is capable of withstanding spillage and inhibits the ability of crawling insects to access the food and water containers. The invention incorporates a feeder component with one or more container sections that is insertable into a holder component that itself is anchored to the ground. The holder component structure further incorporates an internal annular trench that, when filled with water, prevents access to the surrounded feeder component by crawling insects. The assembly allows for easy insertion and removal of the feeder component from the holder component in a manner that facilitates the addition or removal of food and water for the pet. The holder component structure allows for the ease of insertion and removal of the feeder component while still maintaining its isolation from the ground and crawling insects through means of the annular trench and still maintaining its stability through its nearly complete enclosure by the holder component.

US Patent Application No. 2013/0255583

A food/water bowl for pets that can be secured to the ground. The invention comprises a plastic housing having bilaterally spaced, dual food/water compartments. A stake member is provided for securing the plastic housing; to the ground. The stake member may be helical shaped to facilitate insertion of the stake member into the ground and to provide enhanced stability so that the food/water contents do not get wasted from tipping of the container. The stake member and the housing are easily separable for convenience in portability and storage when not needed for feeding the pet.

US Patent Application No. 2011/0041772

A vessel for holding and presenting solids, liquids or both, including a vessel body having a base portion and at least one wall member extending from the base portion and defining at least one cavity for containing solids, liquids or both; a stabilizer including a stabilizer body for ground engagement; and a fastener assembly for releasably retaining the body and the stabilizer in a mated relationship, the fastener including a first fastener portion mounted to the vessel body and a second fastener portion mounted to the stabilizer in a configuration for mating with the first fastener portion when the second fastener portion is closely adjacent a ground surface with the stabilizer body extending into the ground.

US Patent Application No. 2006/0249089

A spill-proof pet dish has a rigid mounting shaft with one of several height adjustable attaching means. A threaded lag bolt end of the shaft attaches to a flat support surface, such as a floor, deck, or patio. A corkscrew device at the end of the shaft for outdoor use screws into the ground. An L-shaped shaft with a clamp on the horizontal leg mounts to vertical elements, such as fence posts. A square Y-shaped shaft with two ramped locking mechanisms supports two pet bowls. A ramped locking mechanism at the top of the shaft removably locks in place a T-shaped locking post attached to the recessed bottom of the pet bowl for removable cleaning or remote refilling of the bowl.

Each of these devices suffers from disadvantages, and it would he desirable to provide a pet food and water receptacle anchor system that is easy to use, inexpensive to manufacture, and which is effective in anchoring the receptacles in various types of surfaces and terrain.

BRIEF SUMMARY OF THE INVENTION

In accordance with one aspect of the invention, a pet food and water receptacle anchoring system includes an anchor that is removably coupled to an anchor receiver on an underside of the food/water receptacle. In a preferred embodiment, the anchor comprises a head member and a screw member, wherein the head member is preferably of a square cross-section, and includes a spring-loaded ballbearing that extends slightly outwardly from at least one side of the head member. The anchor may be screwed downwardly into a wood surface, or alternatively into a sleeve that is secured into a cement surface. For these purposes, it is contemplated that the screw member is either a wood screw (for securing into a wood surface), or a machine screw (for securing into a threaded sleeve that is driven and secured into a concrete surface). Alternatively, the screw member may comprise a corkscrew type of mechanism, which may be screwed into a ground surface (dirt, grass, or the like).

The anchor receiver, which is attached to the underside of the food/water receptacle, preferably comprises a female member defining a hole having a shape corresponding to the shape of the anchor head (preferably square, although any other desirable shapes that prevent the receptacle from spinning about the anchor member may be used). In a preferred embodiment, at least one inner side of the anchor receiver includes a slight indentation to receive the spring-loaded ballbearing of the anchor head. In this way, when the food/water receptacle is placed onto the surface so that the anchor head (which is secured into any desired surface) engages the anchor receiver, the spring-loaded ball-bearing is depressed until it engages with the depression in the side wall on the inside of the anchor receiver, providing a snap-fit mechanism. This snap-fit mechanism is commonly used on ratchet systems, in order to snap fit a socket onto a ratchet.

BRIEF DESCRIPTION OF THE DRAWINGS

These arid other features, aspects, and advantages of the present invention will become better understood with regard to the following description, appended claims, and accompanying drawings where:

FIG. 1 is a perspective exploded view of one embodiment of a pet food or water receptacle having an anchor receiver on an underside thereof, and further showing an anchor preferably used for wood surfaces, which includes an anchor head on an upper portion thereof and a wood screw portion on a lower portion thereof;

FIG. 2 is a perspective exploded view of one embodiment of a pet food or water receptacle having an anchor receiver on an underside thereof, and further showing an anchor preferably used for concrete surfaces, which includes an anchor head on an upper portion thereof and a machine screw, and further shows a threaded sleeve to receive the machine screw portion of the anchor, wherein the threaded sleeve is adapted to be inserted and anchored into a concrete surface;

FIG. 3 is a perspective exploded view of one embodiment of a pet food or water receptacle having an anchor receiver on an underside thereof, and further showing an anchor preferably used for dirt or ground surfaces, which includes an anchor head on an upper portion thereof, a flat ground plate below the anchor head, arid a corkscrew portion below the flat ground plate for insertion into the ground;

FIG. 4 is a perspective exploded view of one embodiment of a pet food and water receptacle having two separate bowls, wherein the receptacle includes an anchor receiver on an underside thereof, and further showing an anchor that is adapted to be received by the anchor receiver, wherein the anchor includes an anchor heat on a top portion thereof, and includes a screw portion on a lower portion thereof;

FIG. 5 is a side cutaway view showing a bucket having an anchor receiver on an underside thereof, and further showing an anchor, wherein the anchor head is engaged within the anchor receiver, and the screw portion of the anchor is secured within a wood surface;

FIG. 6 is a side cross-sectional view of a pet food or water receptacle, wherein the receptacle includes an anchor receiver on an underside thereof, and further showing an anchor, wherein the anchor head is engaged within the anchor receiver, and the screw portion of the anchor is secured within a wood surface;

FIG. 7 is a side cross-sectional view of a pet food or water receptacle, wherein the receptacle includes an anchor receiver on an underside thereof, and further showing an anchor, wherein the anchor head is engaged within the anchor receiver, and the screw portion of the anchor is fully engaged within a threaded sleeve that is secured in a concrete surface; and FIG. 8 is a side cross-sectional view of a pet food or water receptacle, wherein the receptacle includes an anchor receiver on an underside thereof, and further showing an anchor, wherein the anchor head is engaged within the anchor receiver, and the corkscrew portion of the anchor is fully engaged within a ground surface so that the ground plate is flush with the surface of the ground.

DETAILED DESCRIPTION OF THE INVENTION

The present invention includes, in a first embodiment, a pet food/water receptacle 10 having an anchor receiver 12 on an underside thereof. The anchor receiver 12, in a preferred embodiment, is shaped similarly to a ratchet socket, wherein the anchor receiver is a generally round member defining a hole therein that includes a generally square shape for receiving a male anchor head 14 member.

The anchor member 16 includes an anchor head 14 on an upper portion thereof, and an anchor screw member 18 extending downwardly from the anchor head 14. In a preferred embodiment, the anchor head 14 includes a square cross-section (as viewed from above), and further includes a spring-loaded ballbearing 20 extending slightly outwardly from one side thereof. The screw member 18 can take several forms. For use on a wood surface, the screw member 18 may take the shape of a wood screw. For use on a concrete surface, the screw member 18 may take the form of a machine screw that engages a threaded sleeve 22 that is secured into the concrete surface. For use on a ground surface (dirt, grass, or the like), the screw member 18 may take the form of a corkscrew mechanism that may be screwed into the ground. In a preferred ground-use embodiment, a flat ground plate 24 may be disposed between the anchor head 14 and the corkscrew mechanism 18, as shown. It is contemplated that a drill, ratchet, hand wrench, or other like tool may be used to insert the screw member into a surface, or to remove the screw member therefrom.

Preferably, at least one inner side of the anchor receiver 12 (and more preferably, all inner sides thereof) include a slight indentation 26 that engages the spring-loaded ballbearing 20 that is disposed on one side of the anchor head 14. In this way, while the anchor head 14 is being inserted into the anchor receiver 12 on the bottom side of the food/water receptacle 10, the spring-loaded ballbearing 20 is forced inwardly until the anchor head 14 is fully inserted into the anchor receiver 12. At the point of full insertion, the spring-loaded ballbearing 20, which is biased outwardly by the spring, extends into the indentation 26 on the inside wall of the anchor receiver 12, in order to provide a snap-fit mechanism. Such mechanisms are commonly found on ratchets for the snap-fit attachment of a socket to the ratchet.

In use on a wood surface, a user simply screws the anchor member 16 into the wood surface, and then places the pet food/water receptacle 10 onto the surface so that the anchor head 14 is fully received by and snaps into the anchor receiver 12. Similarly, for use on a ground surface (dirt, grass, and the like), a user simply screws the corkscrew 18 into the ground, and then removably attaches the food/water receptacle 10 to the anchor member 16 in snap-fit fashion, as noted above. For use on a concrete surface, a threaded metal sleeve 22 is affixed into the concrete, and the anchor member 16 is simply screwed into the sleeve 22. Then the food/water receptacle 10 is removably affixed thereto. Any standard drill may be used to screw the anchor member 16 into the surface, if desired.

It should be understood that the anchor head 14 and anchor receiver 12 may be made of any shape or size, so long as they fit together in complementary fashion, and preferably in such a way that prevents the receptacle 10 from spinning or rotating about the anchor member 16. Further, it should be understood that any type of food/water receptacle 10 may be used, including single bowl dishes, multiple bowl devices, water buckets, or any other desired receptacle. Additionally, it is contemplated that the anchor system described herein may be used on other things or devices, beyond pet food/water receptacles.

Advantageously, the present anchor system allows a person to easily attach the receptacle 10 to the anchor member 16 by setting the receptacle 10 down in a vertical motion from directly above the anchor member 16. Once the receptacle 10 is snap-fit in place on the anchor member 16, it is difficult, if not impossible for a dog or other pet to dislodge the receptacle 10 from the anchor member 16, because such dislodgement may only occur by lifting the bowl or receptacle 10 directly upwardly to disengage the receptacle 10 from the anchor member 16.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A receptacle anchor system comprising:
a receptacle having sides and a bottom member;
an anchor receiver positioned on an underside of said bottom member, said anchor receiver including anchor receiver side members defining a hole for receiving an anchor head of an anchor member;
said anchor member including said anchor head on a top portion thereof, and a screw member on a bottom portion thereof;
said anchor head including a spring-loaded ballbearing extending outwardly from one face thereof, so that said ballbearing is biased by said spring outwardly from said anchor head;
wherein said anchor member may be screwed into a surface so said receptacle may be removably affixed to said anchor member by inserting said anchor head into said anchor receiver in snap-fit relation and said receptacle may be detached from said anchor member by only pulling said receptacle away from said surface.

2. The receptacle anchor system set forth in claim 1, wherein said anchor receiver member includes an indentation on at least one inner side thereof for engaging said spring-loaded ballbearing when said anchor head is fully inserted within said anchor receiver.

3. The receptacle anchor system set forth in claim 1, wherein said screw portion of said anchor member is in the shape of a wood screw with a point at a bottom end thereof.

4. The receptacle anchor system set forth in claim 1, wherein said screw portion of said anchor member is in the shape of a corkscrew for anchoring said anchor member into ground.

5. The receptacle anchor system set forth in claim 4, further including a ground plate disposed between said anchor head and said corkscrew.

6. The receptacle anchor system set forth in claim 1, wherein said screw portion of said anchor member is in the shape of a machine screw having a flat bottom;
said system further including a threaded sleeve that may be inserted into a concrete surface, wherein said screw portion may be screwed into said threaded sleeve for securement of said anchor member to said concrete surface.

7. An anchor system comprising:
an anchor having an anchor head having four sides and a spring loaded ballbearing extending outwardly from one of said sides, wherein the ballbearing is biased in an outward direction;
said anchor further including a screw member extending downwardly from said anchor head; and
an anchor receiver defining a hole corresponding to a shape and size of said anchor head, so that said anchor head is received into said anchor receiver for removable securement thereto and so said anchor head may be detached from said anchor receiver by only pulling said anchor receiver away from said anchor.

8. The anchor system set forth in claim 7, wherein said anchor receiver includes four inner walls, and wherein at least one of said walls defines an indention for receiving said spring loaded ballbearing when said anchor head is fully inserted into said anchor receiver.

9. The anchor system set forth in claim 8, wherein all four inner walls define an indentation, so that any one of said indentations may engage said spring loaded ballbearing when said anchor head is fully inserted into said anchor receiver.

10. The anchor system set forth in claim 7, wherein said anchor receiver is attached to an object to be secured to a surface.

11. The anchor system set forth in claim 7, wherein said screw member is selected from the group consisting of a wood screw, a machine screw, and a corkscrew.

12. The anchor system set forth in claim 7, wherein said screw member is a machine screw, and further including a sleeve having threads on an inner portion thereof for engaging said machine screw.

* * * * *